(12) United States Patent
Jacobson et al.

(10) Patent No.: US 10,552,745 B2
(45) Date of Patent: Feb. 4, 2020

(54) PREDICTIVE AUTO SCALING ENGINE

(71) Applicant: Netflix, Inc., Los Gatos, CA (US)

(72) Inventors: Daniel Isaac Jacobson, Los Altos, CA (US); Neeraj Joshi, San Jose, CA (US); Puneet Oberai, San Carlos, CA (US); Yong Yuan, Fremont, CA (US); Philip Simon Tuffs, Pacific Grove, CA (US)

(73) Assignee: NETFLIX, INC., Los Gatos, CA (US)

( * ) Notice: Subject to any disclaimer, the term of this patent is extended or adjusted under 35 U.S.C. 154(b) by 605 days.

(21) Appl. No.: 14/057,898

(22) Filed: Oct. 18, 2013

(65) Prior Publication Data

US 2015/0113120 A1   Apr. 23, 2015

(51) Int. Cl.
*H04L 12/26* (2006.01)
*G06N 5/04* (2006.01)
*H04L 12/911* (2013.01)

(52) U.S. Cl.
CPC .......... *G06N 5/04* (2013.01); *H04L 43/0817* (2013.01); *H04L 47/70* (2013.01)

(58) Field of Classification Search
CPC ............................ H04L 43/08; H04L 43/0817
USPC ................................................. 709/224–226
See application file for complete search history.

(56) References Cited

U.S. PATENT DOCUMENTS

| | | | |
|---|---|---|---|
| 9,274,847 B2* | 3/2016 | Sood | G06F 9/5005 |
| 2003/0055969 A1* | 3/2003 | Begun | G06F 1/3203 |
| | | | 709/226 |
| 2008/0109547 A1* | 5/2008 | Bao | G06F 11/3495 |
| | | | 709/224 |
| 2009/0181665 A1* | 7/2009 | Sater | H04L 41/5009 |
| | | | 455/424 |
| 2010/0232594 A1* | 9/2010 | Lawson | G06F 9/505 |
| | | | 379/220.01 |
| 2011/0258621 A1 | 10/2011 | Kern | |
| 2011/0295999 A1* | 12/2011 | Ferris | G06F 9/5072 |
| | | | 709/224 |
| 2012/0259976 A1 | 10/2012 | Bhagat et al. | |

(Continued)

FOREIGN PATENT DOCUMENTS

| | | |
|---|---|---|
| CN | 103220337 A | 7/2013 |
| WO | 2013006708 A1 | 1/2013 |

OTHER PUBLICATIONS

Extended European Search Report Application No. 14187822.3, dated May 6, 2016, 8 pages.

*Primary Examiner* — Jason D Recek
(74) *Attorney, Agent, or Firm* — Artegis Law Group, LLP

(57) ABSTRACT

Techniques for predictively scaling a distributed application are described. Embodiments could monitor performance of an application within a cloud computing environment over a first window of time to collect historical performance data. Here, the application comprises a plurality of application instances. A workload of the application could be monitored over a second window of time to collect historical workload data. Embodiments could analyze both the historical performance data and the historical workload data to determine one or more scaling patterns for the application. Upon determining a present state of the application matches one of the one or more scaling patterns, a plan for predictively scaling the application could be determined. Embodiments could then predictively scale the plurality of application instances, based on the determined plan.

26 Claims, 5 Drawing Sheets

(56) References Cited

U.S. PATENT DOCUMENTS

| | | | |
|---|---|---|---|
| 2013/0007753 A1* | 1/2013 | Jain | G06F 9/46 |
| | | | 718/103 |
| 2013/0060933 A1* | 3/2013 | Tung | G06F 11/3495 |
| | | | 709/224 |
| 2013/0086235 A1* | 4/2013 | Ferris | G06F 9/505 |
| | | | 709/223 |
| 2013/0174146 A1 | 7/2013 | Dasgupta et al. | |
| 2013/0174149 A1* | 7/2013 | Dasgupta | G06F 9/5077 |
| | | | 718/1 |
| 2014/0075033 A1* | 3/2014 | Doering | H04L 41/5054 |
| | | | 709/226 |
| 2014/0289418 A1* | 9/2014 | Cohen | G06F 11/3688 |
| | | | 709/226 |
| 2015/0286507 A1* | 10/2015 | Elmroth | G06F 11/3442 |
| | | | 718/104 |

* cited by examiner

PREDICTIVE AUTO SCALING ENGINE

BACKGROUND

Technical Field

Embodiments generally relate to workload management, and more specifically to predictively scaling a number of instances of an application executing within a cloud computing environment in anticipation of the application's future workload.

Description of Related Art

Efficient resource allocation is a constant challenge for modern cloud computing environments. For example, a particular application may require 100 application instances in order to process its peak workload, but could require only 40 application instances for processing its average workload. In this example, the application could be configured to operate using 40 application instances, but such a configuration would fail to accommodate the application's peak workload. Likewise, the application could be configured to operate using 100 application instances all of the time, but such a configuration would lead to an efficient use of resources, as application instances may sit idle or are underutilized during times of non-peak workload. As such, cloud solutions may attempt to reactively scale the number of application instances in order to meet the fluctuating workload. That is, logic could determine when the application resources are sitting idle or when the application is unable to keep up with its current workload, and could scale the number of application instances down or up accordingly. However, as the application's workload is almost certainly dynamic in practice, it can be challenging to scale the number of application instances in order to accommodate the increasing or decreasing workload.

As an additional challenge, the start-up process of many applications may require a substantial amount of time. Thus, if the additional application instances are not created until the system detects the application is underperforming relative to the current workload, and the application instances take a substantial amount of time to initialize, the application may fall further behind relative to its current workload while waiting on the application instances to initialize. Such a scenario can lead to further underperformance by the application, and in some circumstances can lead to the system reactively spawning even more additional application instances in order to address the underperformance, resulting in an excessive number of application instances. Moreover, in the event such reactive scaling techniques are not fast enough to meet the increasing workload, the system may fail to catch up altogether, potentially resulting in interruptions, errors or even a complete system failure.

SUMMARY

One embodiment disclosed herein provides a method that includes monitoring performance of an application within a cloud computing environment over a first window of time to collect historical performance data. The application includes a plurality of application instances. The method also includes monitoring a workload of the application over a second window of time to collect historical workload data. Additionally, the method includes analyzing both the historical performance data and the historical workload data to determine one or more scaling patterns for the application. The method further includes, upon determining a present state of the application matches one of the one or more scaling patterns, determining a plan for predictively scaling the application. Moreover, the method includes predictively scaling the plurality of application instances, based on the determined plan, and monitoring the performance of the application with the scaled plurality of application instances over a second window of time to collect at least one of additional performance data and additional workload data, wherein the at least one of additional performance data and additional workload data is used to influence future scaling events.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

DETAILED DESCRIPTION

Figure 1:
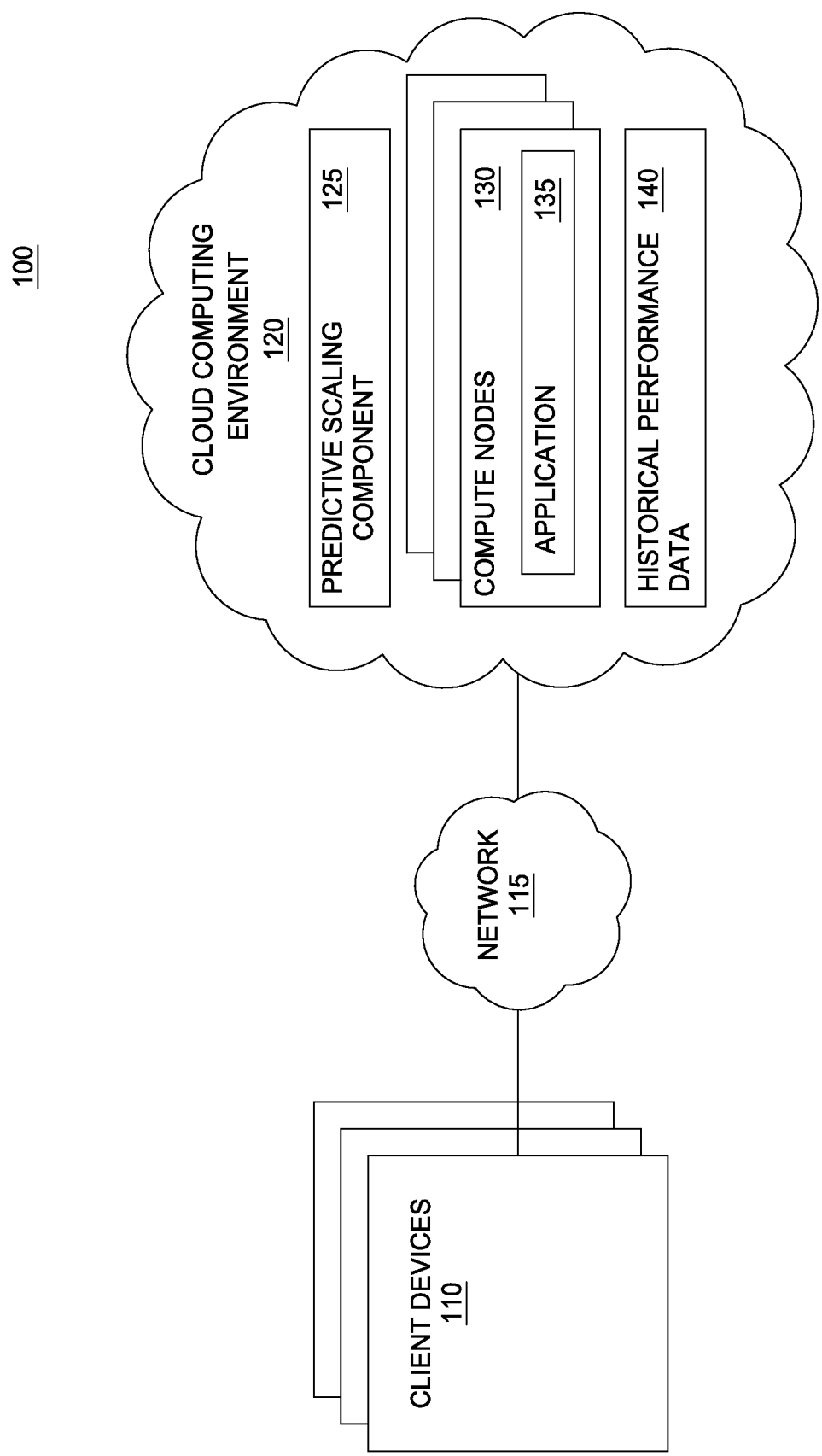
FIG. 1 illustrates a computing infrastructure configured with a predictive scaling component, according to one embodiment described herein.

Generally speaking, many large-scale applications comprise a number of different application instances. The application's workload can be distributed throughout these application instances through the use of a load balancing algorithm(s). Generally, there are a number of advantages to designing applications in this fashion. For instance, application instances can be added or removed in order to dynamically scale the size of the application, allowing for the application to handle an increased workload (i.e., by adding instances) or to free-up idle or underutilized computing resources (i.e., by removing instance). Moreover, if one application instance fails, the remaining application instances can take on the failing instance's workload, providing redundancy for the application.

One challenge in managing a large-scale application (e.g., a video streaming service and its supporting applications) running in a cloud environment is that the workload of such an application can vary dramatically over time. For example, such a video streaming service may experience its peak workload in the evenings during peak television viewing hours, yet the same streaming service could experience a much lighter workload in the early morning hours when viewer demand is not as great. Moreover, as the video streaming service adds new viewers, the peak workload on a given night of the week could increase substantially on a week-over-week basis, in accordance with the growth in viewers. This may be particularly pronounced during times of rapid growth in viewership, e.g., during a promotional period for the video streaming service.

Currently, cloud computing environments may be configured to reactively scale the number of application instances, based on the application's current workload at a given point in time. For example, the cloud computing environment could detect that the currently instantiated application instances are unable to keep up with the number of incoming requests, and thus could determine that additional application instances should be instantiated in order to help meet the application's current workload.

While such reactive scaling techniques can perform adequately in certain situations (e.g., when the start-up time of the application is relatively short, when the workload changes at a relatively slow rate, etc.), these techniques are ill-suited for use with some applications. For example, the application instances for a particular application may take over an hour to fully initialize. With such an application, if the additional application instances are not created until the current number of application instances are unable to keep up with the current workload (i.e., a reactive scaling solution), a backlog of incoming requests may continue to accumulate for over an hour until the additional application instances are brought online. As such, users may experience delays or service interruptions during this start-up time. Moreover, as the workload may have continued to increase during this lengthy start-up time, the number of additional application instances may no longer be sufficient by the time the additional application instances are fully initialized. This problem is compounded, as the backlog of requests built up during the additional application instance's start-up time must also be processed.

As such, embodiments provide techniques for predictively scaling a number of application instances for an application in a cloud computing environment. Embodiments may monitor performance of an application within a cloud computing environment over a first window of time to collect historical performance data. For example, embodiments could collect performance information such as how many requests per unit of time an application instance can process and an average start-up time for creating a new application instance. Additionally, embodiments may monitor a workload of the application over a second window of time to collect historical workload data. Here, embodiments could collect information as to how the application's workload varies throughout the day, as well as how the workload varies on individual days of the week.

Embodiments could then analyze both the historical performance data and the historical workload data to determine one or more scaling patterns for the application. For example, embodiments could perform a statistical analysis of the collected data in order to determine one or more patterns that are indicative of an increase or decrease in the application's workload. Additionally, embodiments could determine that a present state of the application matches one of the one or more scaling patterns, and in response, could determine a plan for predictively scaling the application. For example, embodiments could determine a number of application instances that are likely to be needed at a future point in time, and could establish a timeline for scaling the current number of application instances in order to achieve the determined number of application instances by the future point in time. Embodiments could then predictively scale the plurality of application instances, based on the determined plan. Advantageously, doing so provides a predictive scaling solution that can anticipate fluctuations in the application's workload and can scale the number of application instance's accordingly.

FIG. 1 illustrates a computing infrastructure configured with a predictive scaling component, according to one embodiment described herein. As shown, the system 100 includes a plurality of client devices 110 and a cloud computing environment, connected via a network 115. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. Typically, cloud computing resources are provided to a user on a pay-per-use basis, where users are charged only for the computing resources actually used (e.g. an amount of storage space consumed by a user or a number of virtualized systems instantiated by the user). A user can access the resources that reside in the cloud at any time, and from anywhere across the Internet.

Here, the cloud computing environment 120 includes a predictive scaling component 125, a plurality of compute nodes 130 and historical performance data 140. Generally, the compute nodes 130 reflect computing systems (e.g., virtual machines) within the cloud computing environment 120. Here, each of the compute nodes 130 includes an application instance 135 of a distributed application. For purposes of this example, assume that the application instances 135 hosted on the compute nodes 130 all correspond to a single distributed application (e.g., a video streaming service). Of note, while a single application instance 135 is shown within each of the compute nodes 130, such a depiction is for illustrative purposes only, and other embodiments may instantiate 2 or more application instances 135 on a compute node 130. More generally, embodiments described herein may be configured for use with any configuration for hosting the application instances 135 within the cloud computing environment 120.

Here, the predictive scaling component 125 could monitor the execution of the application instances 135 over a period of time to collect the historical performance data 140. Generally, the historical performance data 140 comprises data relating to the performance of the application instances 135, such as how many incoming requests a particular application instance processes on average during a unit of time (e.g., processed requests per minute) as well as the latencies of those requests (e.g., how long, on average, a single request takes to process). Additionally, the predictive scaling component 125 could monitor the workload of the distributed application over a period of time. For example, the predictive scaling component 125 could monitor a number of incoming requests from the client devices 110 to collect historical workload data for the distributed application. The predictive scaling component 125 could then perform a statistical analysis of the workload data (and potentially the historical performance data 140 as well) in order to determine one or more scaling patterns.

Generally, the scaling patterns represent a pattern or trend in the incoming workload of the application that is indicative of a future workload of the application. Such a statistical analysis can also consider factors such as the time of day, the day of the week, a related application's workload, and so on in determining the scaling patterns. For example, the predictive scaling component 125 could determine that the rate of increase of the incoming workload during the hours leading up to the hours of peak workload is indicative of the amount of peak workload for a given day. For example, the predictive scaling component 125 could determine that a relatively large rate of increase in the application's workload during the hours leading up to the time of historically peak workload (e.g., evening hours when the demand for video streaming services are greatest), indicates that the peak workload for that particular day will be relatively high. As another example, if the predictive scaling component 125 determines that the rate of increase in the application's workload is relatively low, the predictive scaling component 125 could determine that the peak workload will also be relatively low for that particular day. Of course, these examples of scaling patterns are provided without limitation and for illustrative purposes only, and more generally any pattern determined from statistically analyzing the collected workload data can be used, consistent with the functionality described herein.

Upon determining the scaling patterns, the predictive scaling component 125 could monitor the application's current workload to determine when the current workload matches one of the determined scaling patterns. Continuing the above example, the predictive scaling component 125 could determine that, for a given day, the application's rate of increase in workload is relatively high during the hours leading up to the time period of historically peak workload. The predictive scaling component 125 could then determine an anticipated future workload of the application, based on the scaling pattern and the application's current workload. In one embodiment, the predictive scaling component 125 is configured to determine the application's future workload, at a future point in time based on the application's start-up time. For example, if the application's start-up time is approximately 1 hour, the predictive scaling component 125 could determine the application's future workload 1 hour from the current time. In one embodiment, the future point in time is determine based on the application's average start-up time plus some predefined period of time (e.g., 10 minutes), to help ensure the application instances will be started in advance of the future workload.

Once the application's future workload is estimated, the predictive scaling component 125 could then determine a number of application instances needed to satisfy the estimated future workload. Generally, if the future workload is greater than the application's current workload, a number of additional applications may need to be instantiated in order to accommodate the increased workload. On the other hand, if the estimated future workload is less than the current workload, some number of application instances could be shutdown in order to avoid idle or underutilized computing resources.

The predictive scaling component 125 could then determine a plan for predictively scaling the application, based on the determined number of application instances needed to satisfy the estimated future workload and an average start-up time for the application instances. For example, the predictive scaling component 125 could determine that 10 additional application instances will be needed to accommodate the estimated future workload 1 hour from now, and could further determine that 20 additional application instances will be needed to accommodate the estimated future workload 2 hours from now. If the predictive scaling component 125 then determines that the application instances have an average start-up time of 45 minutes, the predictive scaling component 125 could determine a plan to instantiate 10 additional application instances 15 minutes from now (i.e., to satisfy the estimated workload 1 hour into the future), and to instantiate 10 additional application instances 75 minutes from now (i.e., to satisfy the estimated workload 2 hours into the future). Advantageously, doing so allows the predictive scaling component 125 to predictively scale the distributed cloud application based on the application's estimated future workload, allowing the application to more smoothly handle fluctuations in workload.

On the other hand, if the predictive scaling component 125 determines that the future workload is less than the current workload and that 10 fewer application instances will be needed to process the future workload, the predictive scaling component 125 then determine a plan for shutting down particular application instances over a window of time. In doing so, the predictive scaling component 125 could consider an average shutdown time of an application instance. By reducing the number of application instances in response to a predicted decrease in future workload, the predictive scaling component 125 helps to avoid underutilized application instances, thereby reducing the cost of running the application. Moreover, doing so also frees up the computing resources associated with the shutdown application instances, thereby freeing these resources up for other purposes as needed.

Generally, the predictive scaling component 125 may be combined with other scaling and load management techniques as well, in order to ensure the system health, availability and optimization of the application. As an example, in one embodiment, the predictive scaling component 125 is configured to operate in conjunction with a reactive scaling component that is configured to add or remove application instances in response to changes in workload (e.g., incoming request volume). For instance, the predictive scaling component 125 could be configured to provide a minimum number of active application instances based on an estimated future workload of the application, while the reactive scaling component could instantiate additional application instances in response to an unanticipated workload. Here, while traditional reactive scaling techniques could reduce the number of active application instances in response to a temporary drop in request volume, doing so could lead to a failure of the service when the normal request volume for the application resumes. In such a scenario, the predictive scaling component 125 could prevent the number of application instances from falling below a threshold number of application instances, based on the application's predicted workload at a future point in time, thereby avoiding the failure of the service when the normal request volume resumes. Advantageously, combining the predictive scaling component 125 with other scaling techniques, such as a reactive scaling component, may improve the performance of the system, allowing the reactive scaling component to respond to fluctuations in workload while ensuring a minimum number of application instances remain instantiated based on a predicted future workload of the application.

Of note, while the above example involves the predictive scaling component 125 working in conjunction with a reactive scaling component, such an example is provided without limitation and for illustrative purposes only. More generally, it is broadly contemplated that the predictive scaling component 125 may work in conjunction with a variety of other scaling and more general workload management techniques, in order to improve the performance and efficiency of the system. For example, the predictive scaling component 125 could work in conjunction with a hardware scaling component configured to scale the resources (e.g., memory, processors, etc.) executing the application instances, based on the application's workload. As another sample, the predictive scaling component 125 could work in conjunction with a component configured to scale a downstream resource (e.g., a number of database instances, hardware resources on which the database instances are executing, etc.), in response to the application's current workload and/or predictive future workload.

Figure 2:
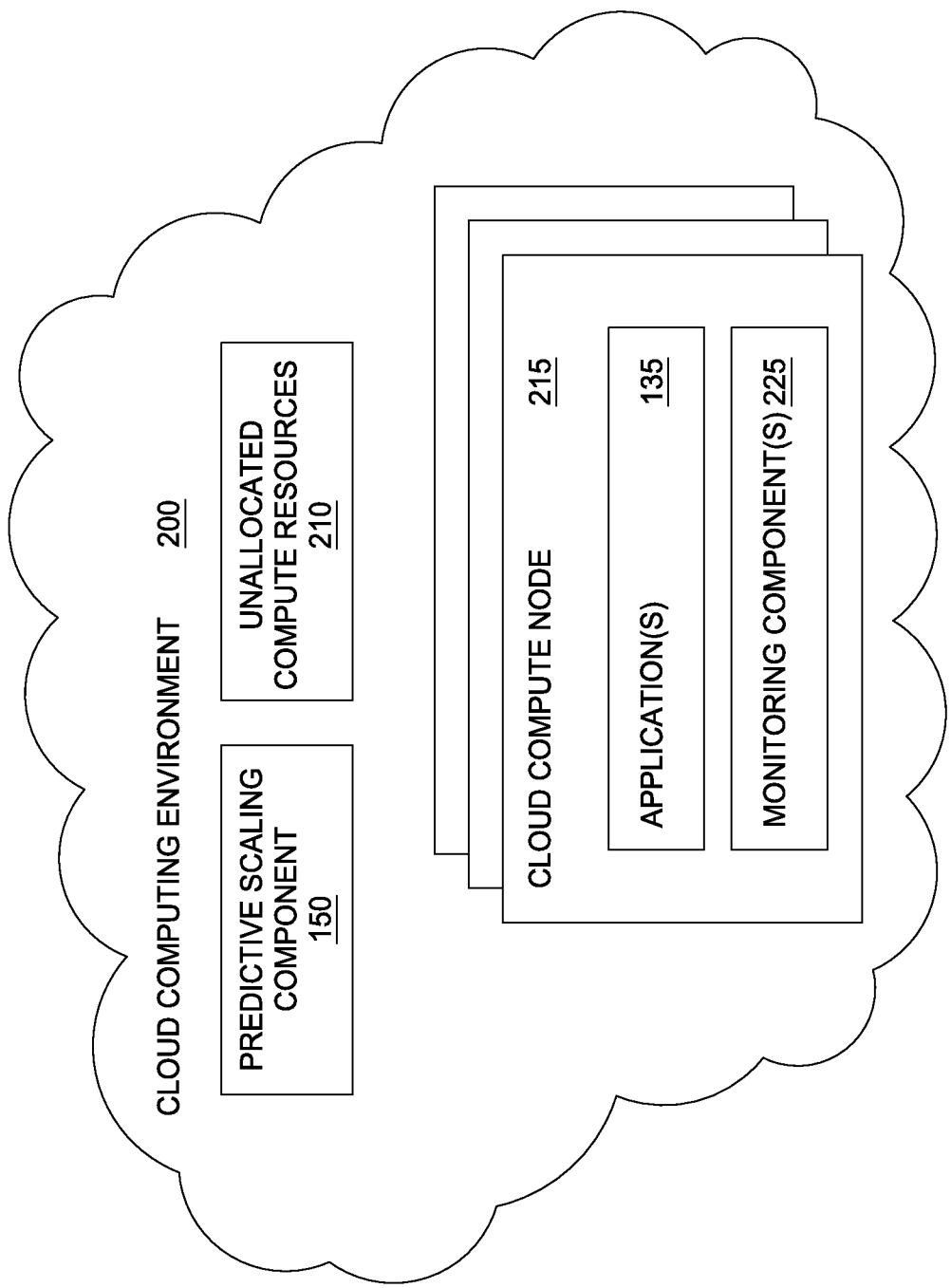
FIG. 2 illustrates a computing infrastructure configured with a predictive scaling component, according to one embodiment described herein.

FIG. 2 illustrates a computing infrastructure configured with a predictive scaling component, according to one embodiment described herein. As shown, the cloud computing environment 200 includes the predictive scaling component 125, unallocated compute resources 210, and a plurality of compute nodes 215. Here, each of the compute nodes 215 is configured with one or more application instances 135 and one or more monitoring components 225. In such an embodiment, the monitoring components 225 could monitor their respective application instance 135 in order to collect performance and workload data. The monitoring components 225 could then transmit the collected data to the predictive scaling component 125, and the predictive scaling component 125 could use such data to predictively scale the number of application instances 135 and the number of compute nodes 215.

For example, the predictive scaling component 125 could determine that the present workload of the application instances 135 matches a particular scaling pattern, indicating that the application's workload will substantially increase within some period of time. In response to such a determination, the predictive scaling component 125 could allocate a number of additional compute nodes 215 using the unallocated compute resources 210, and could initialize a number of new application instances 135 on these additional compute nodes. Generally, it is preferable for the predictive scaling component 125 to determine the application's future workload at some point in the future that is at least as long as the application instances' average start-up time, in order to assure that the application instances can be fully operational and ready to process the future workload at the future point in time. For example, if the application instances take an average of 60 minutes to fully initialize, the predictive scaling component 125 may be configured to predict the future workload 75 minutes into the future and to create a number of additional application instances sufficient to process this estimated future workload, so that the application instances will be initialized and operational in advance of the future workload.

In one embodiment, the predictive scaling component 125 is configured to monitor the growth in application traffic over time and to adjust its application scaling accordingly. For example, a video streaming service could continue to increase its subscriber base over time, and the number of subscribers using the video streaming service may increase month-over-month. As a result, the number of application instances needed to process the incoming workload at a given point in time during the week may continue to increase proportionately to the change in the subscription base. For example, if the subscriber base increases 20% within a one year period, the incoming workload on an average Tuesday evening at 5:00 pm may be approximately 20% higher today than it was a year ago. As such, the predictive scaling component 125 could be configured to take the growth (or decrease) in users into account when generating a plan for scaling the application instances. Of course, such an example is provided without limitation and for illustrative purposes only.

Moreover, while the predictive scaling component 125 may alter the scaling plan based on the growth in users, such growth may not always relate in a proportionate manner. For example, while the growth in subscriptions in a one year period may increase slightly, the average workload at a particular day and time may increase substantially over the same one year period due to other factors. For instance, as more content is added to the video streaming service over the course of the year, the viewing patterns of the subscribers may also change as a result. As a result, the predictive scaling component 125 may consider the growth in subscribers as one of many factors in predicting the future workload of the application and in determining the plan for scaling the number of application instances accordingly.

Additionally, the predictive scaling component 125 may consider known events in predicting the application's future workload. Examples of such events include daylight savings time, the availability of particular content (e.g., a live stream of a particular sporting event), holidays, and so on. Such events may be specified to the predictive scaling component 125 programmatically (e.g., events that happen each year such as holidays, daylight savings time, etc.) or could be manually specified by a user (e.g., a live stream of a particular event). More generally, however, the predictive scaling component 125 may consider any event having any correlation to the workload of the application. Moreover, different events may have a different correlation to the application, depending on the type of the application. For example, if the application is a video streaming service, a holiday could indicate an increase in the application's workload as users are home from work. On the other hand, if the application is a personnel application for use by a business, the holiday could indicate a decrease in the application's workload as the users are out of the office on the specified day. Advantageously, by considering such events, the predictive scaling component 125 can more accurately and reliability predict the future workload of the application and scale the application instances accordingly.

Figure 3:
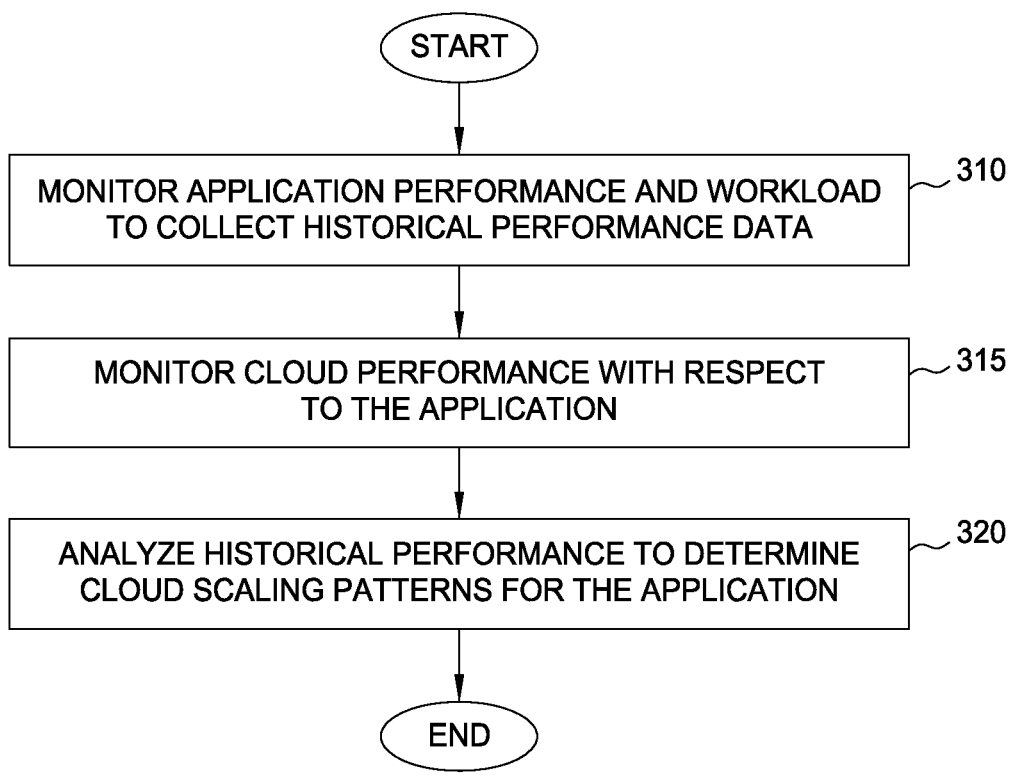
FIG. 3 is a flow diagram illustrating a method for determining performance patterns of a cloud application, according to one embodiment described herein.

FIG. 3 is a flow diagram illustrating a method for determining performance patterns of a cloud application, according to one embodiment described herein. As shown, the method 300 begins at block 310, where the predictive scaling component 125 monitors the performance and workload of an application instance(s) in order to collect historical performance data. Such data may include, without limitation, a number of incoming requests per unit of time, a number of requests processed by a given application instance per unit of time, a start-up time of a new application instance, a shutdown time of an application instance, and so on. Additionally, the predictive scaling component 125 monitors the performance of the cloud computing environment with respect to the application (block 315). For example, in addition to the start-up time of the application instances, there may be an additional start-up time of configuring and initializing a new cloud compute node on which to run the new application instance.

The predictive scaling component 125 then analyzes the collected performance data in order to determine scaling patterns for the application (block 320), and the method 300 ends. For example, the predictive scaling component 125 could determine that the historical workload data indicates that the application's workload increases dramatically leading up to 5:00 pm each day, and that the amount of peak workload is proportional to the rate of increase around this time. The predictive scaling component 125 could then use such a scaling pattern in order to predictively scale a number of application instances, in order to accommodate the predicted future workload.

In one embodiment, the predictive scaling component 125 is configured to operate in a feedback loop, where data is continually fed back to the predictive scaling component 125 in order to improve future scaling operations. Such data may include, for example, data describing a workload of the application, data describing one or more scaling patterns for the application, data describing an impact of scaling operations on the system as a whole, and so on. Advantageously, by feeding such data back into the predictive scaling component 125, embodiments can more accurately predict when future scaling operations are needed and can optimize such future scaling operations as well. For example, such data could be used to determine that a particular scaling plan in which a substantial number of additional application instances were provisioned caused unintended side effects, e.g., placing sudden pressure on one or more downstream components. In response to such a determination, the predictive scaling component 125 could learn from the historical scaling operations and related data, and the predictive scaling component 125 could optimize future scaling operations (e.g., by restricting the number of additional application instances instantiated, by evenly distributing optimal sized scaling operations over a period of time, etc.) to minimize unintended side effects in the future.

Figure 4:
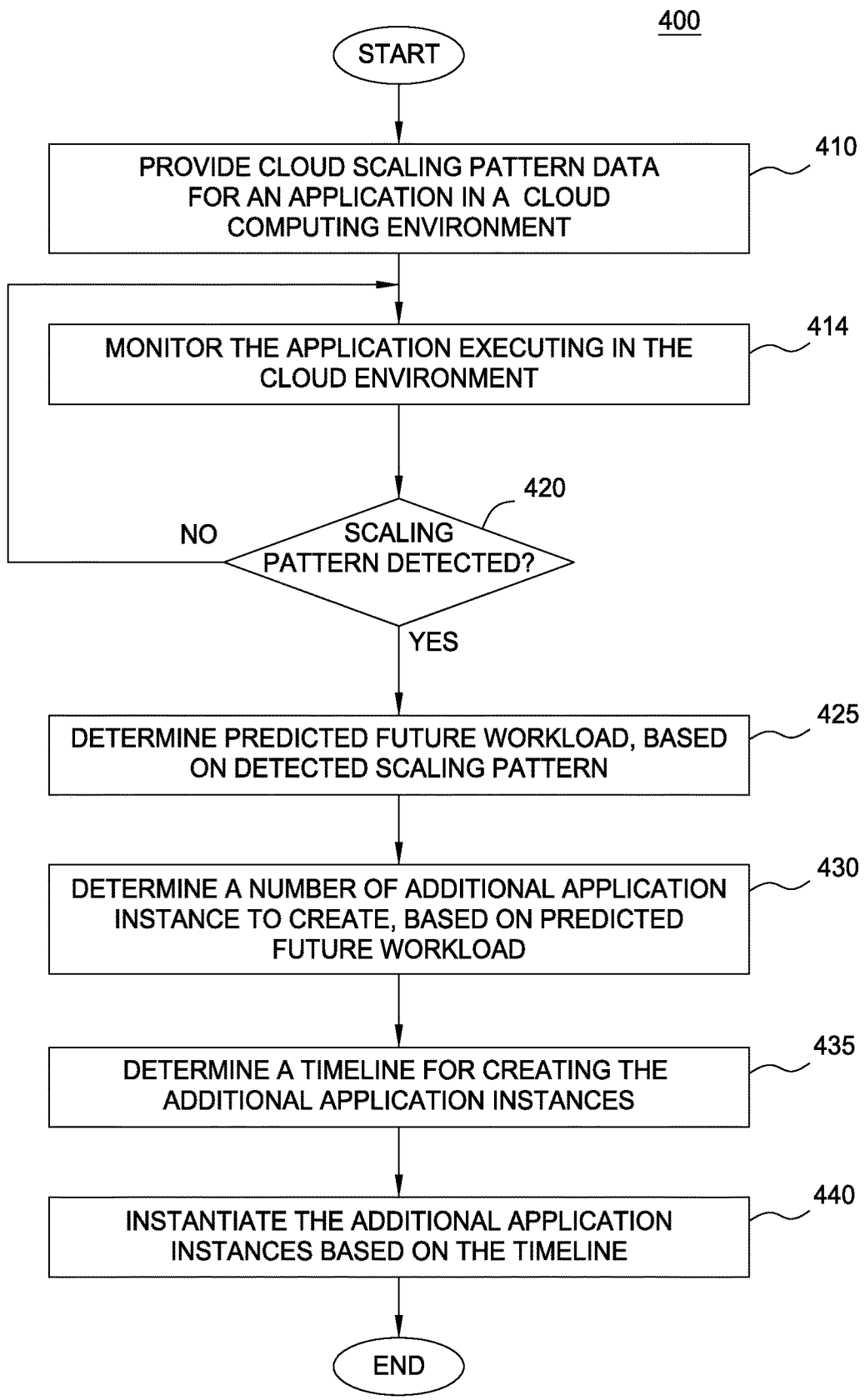
FIG. 4 is a flow diagram illustrating a method for predictively scaling instances of a cloud application, according to one embodiment described herein.

FIG. 4 is a flow diagram illustrating a method for predictively scaling instances of a cloud application, according to one embodiment described herein. As shown, the method 400 begins at block 410, where the predictive scaling component 125 provides scaling pattern data for an application hosted in a cloud computing environment. Such pattern data could be determined, for example, using the method 300 shown in FIG. 3 and discussed above. The predictive scaling component 125 then monitors the application executing in the cloud environment (block 414), in order to detect when one of the scaling patterns is satisfied (block 420). Here, if the application's current performance and workload do not match any of the scaling patterns, the method 400 returns to block 414, where the predictive scaling component 125 continues monitoring the application.

If instead the predictive scaling component 125 detects that the application's current performance and workload matches one of the scaling patterns, the method 400 proceeds to block 425, where the predictive scaling component 125 determines a predicted future workload of the application based on the scaling pattern. For instance, continuing the example given above where the historical workload data indicates that the application's workload increases dramatically leading up to 5:00 pm each day, and that the amount of peak workload is proportional to the rate of increase around this time, the predictive scaling component 125 could determine an estimated future workload of the application, based on the application's current rate of increase in workload leading up to 5:00 pm. As discussed above, the predictive scaling component 125 may be configured to estimate the future workload at some point in the future at least as long as the application instance's average start-up time, so as to ensure that the application instances can be fully initialized in advance of the future workload.

Once the predictive scaling component 125 has determined the estimated future workload, the predictive scaling component 125 determines a number of additional application instances to create based on the estimated future workload (block 430). Of note, this example assumes that the estimated future workload is greater than the application's current workload. However, in other examples where the future workload is less than the application's current workload, the predictive scaling component 125 could determine a number of application instances that are no longer needed to satisfy the estimated future workload.

Returning to the present example, the predictive scaling component 125 also determines a timeline for creating the additional application instances (block 435). Here, the predictive scaling component 125 may be configured to consider the average start-up of an application instance in creating the timeline, in order to ensure that the additional application instances will be fully initialized in anticipation of the increased future workload. The predictive scaling component 125 then instantiates the additional application instances based on the determined timeline (block 440), and the method 400 ends.

Figure 5:
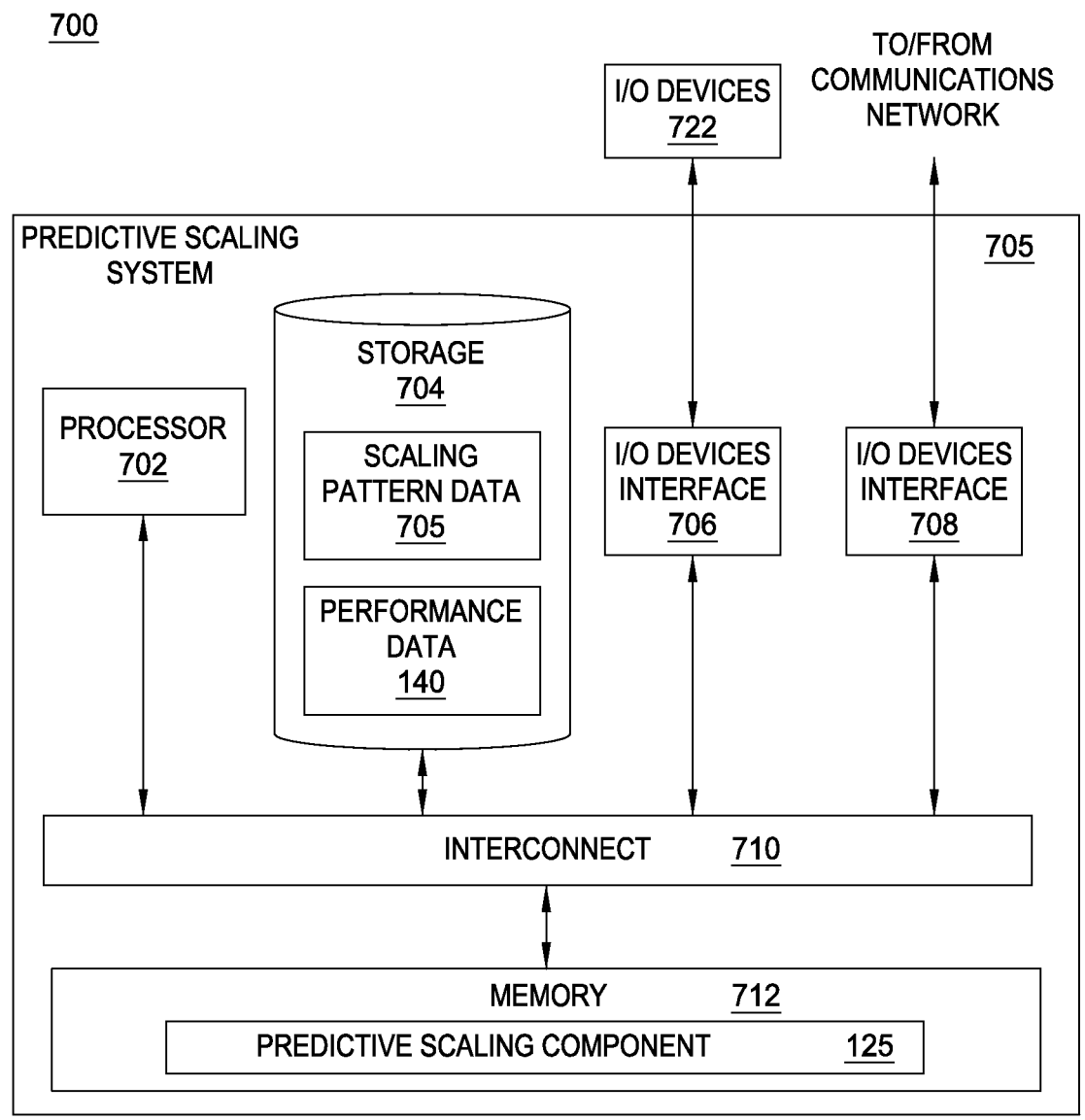
FIG. 5 illustrates a computing infrastructure configured with a predictive scaling component, according to one embodiment described herein.

FIG. 5 illustrates a computing infrastructure configured with a predictive scaling component, according to one embodiment described herein. As shown, the environment 700 includes a predictive scaling system 705 which includes, without limitation, a central processing unit (CPU) 702, a network interface 708, an interconnect 710, and a system memory 712. The CPU 702 retrieves and executes programming instructions stored in the system memory 712. Similarly, the CPU 702 stores and retrieves application data residing in the system memory 712. The interconnect 710 facilitates transmission, such as of programming instructions and application data, between the CPU 702, input/output (I/O) devices interface 706, storage 704, network interface 708, and system memory 712. The I/O devices interface 706 is configured to receive input data from user I/O devices 722. Examples of user I/O devices 722 may include one of more buttons, a keyboard, and a mouse or other pointing device. The I/O device interface 706 may also include an audio output unit configured to generate an electrical audio output signal, and user I/O devices may further includes a speaker configured to generate an acoustic output in response to the electrical audio output signal. Another example of an I/O device is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

CPU 702 is included to be representative of a single CPU, multiple CPUs, a single CPU having multiple processing cores, and the like. And the system memory 712 is generally included to be representative of a random access memory. The storage 704 may be a disk drive storage device. Although shown as a single unit, the storage 704 may be a combination of fixed and/or removable storage devices, such as fixed disc drives, floppy disc drives, tape drives, removable memory cards, or optical storage, network attached storage (NAS), or a storage area-network (SAN). The network interface 708 is configured to transmit data via the communications network, e.g., to transmit context tokens and localized digital assets from client devices as well as to return a assembled variation of digital content generated by the dynamic context-based assembler to the client devices.

The system memory 712 stores a predictive scaling component 125 that is configured to monitor an application's performance and workload over time, for use in predictively scaling a number of instances of the application in anticipation of future workloads. As discussed above, the predictive scaling component 125 could monitor performance of an application within a cloud computing environment over a first window of time to collect historical performance data, where the application comprises a plurality of application instances. Additionally, the predictive scaling component 125 could monitor a workload of the application over a second window of time to collect historical workload data. The predictive scaling component 125 could then analyze both the historical performance data and the historical workload data to determine one or more scaling patterns for the application. Upon determining a present state of the application matches one of the one or more scaling patterns, the predictive scaling component 125 could determine a plan for predictively scaling the application, and could use the plan to predictively scale the plurality of application instances.

In the preceding, reference is made to various embodiments. However, it should be understood that the present disclosure is not limited to specific described embodiments. Instead, any combination of the preceding features and elements, whether related to different embodiments or not, is contemplated to implement and practice the functionality described herein. Furthermore, although particular embodiments may achieve advantages over other possible solutions and/or over the prior art, whether or not a particular advantage is achieved by a given embodiment is not limiting of the present disclosure. Thus, the preceding aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

While the foregoing is directed to various embodiments, other and further embodiments may be devised without departing from the basic scope thereof. For example, embodiments may be implemented in hardware or software or in a combination of hardware and software. One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions described herein, are embodiments of the present disclosure.

Therefore, the scope of the present disclosure is determined by the claims that follow.

We claim:

1. A method, comprising:
   monitoring, via a predictive scaling engine executed by one or more processors, performance of an application within the cloud computing environment over a first window of time to collect historical performance data, wherein the application comprises a plurality of application instances;
   monitoring, via the predictive scaling engine, a workload of the application over a second window of time to collect historical workload data, wherein the historical workload data indicates a rate of change of the workload of the application over at least a portion of the second window of time;
   analyzing, via the predictive scaling engine, both the historical performance data and the historical workload data to determine one or more scaling patterns for the application, wherein a magnitude of a predicted peak workload associated with a first scaling pattern is determined based on the rate of change of the workload of the application, a number of subscriptions to the application, and a number of content items available for consumption within the application;
   upon determining a present state of the application matches one of the one or more scaling patterns, determining, via the predictive scaling engine:
      a future point in time when the application should be predictively scaled, and
      a plan for predictively scaling the application at the future point in time; and
   predictively scaling, via the predictive scaling engine, the plurality of application instances, based on the determined plan.

2. The method of claim 1, wherein determining the plan for predictively scaling the application further comprises:
   determining that the workload of the application will increase at a first point in time, based on a present workload of the application and the matching scaling pattern;
   determining an estimated future workload of the application, based on the present workload of the application; and
   determining a number of additional application instances to instantiate to satisfy the estimated future workload.

3. The method of claim 2, wherein the historical performance data includes startup time data for the plurality of application instances, wherein determining the plan for predictively scaling the application further comprises:
   determining a first timeline for instantiating the number of additional application instances, based on the startup time data,
   wherein predictively scaling the plurality of application instances is further based on the determined first timeline, and further comprises:
      instantiating one or more additional application instances according to the determined first timeline.

4. The method of claim 3, wherein determining the plan for predictively scaling the application further comprises:
   determining that the workload of the application will decrease at a first point in time, based on the present state of the application and the matching scaling pattern;
   determining an estimated future workload of the application, based on the present workload of the application, wherein the estimated future workload is less than a current workload of the application; and determining a number of the plurality of application instances that will be needed to process the estimated future workload, wherein the determined number of application instances is less than a current number of application instances.

5. The method of claim 4, wherein the historical performance data includes shutdown time data for the plurality of application instances, wherein determining the plan for predictively scaling the application further comprises:
determining a second timeline for shutting down application instances in order to achieve the determined number of application instances, based on the shutdown time data,
wherein predictively scaling the plurality of application instances is further based on the determined second timeline, and further comprises:
shutting down one or more of the plurality of application instances according to the determined second timeline.

6. The method of claim 1, wherein the historical performance data includes at least a measure of requests processed by an application instance per a unit of time, and wherein the historical workload data includes at least a measure of incoming requests per a second unit of time.

7. The method of claim 1, wherein analyzing both the historical performance data and the historical workload data to determine one or more scaling patterns for the application further comprises:
determining one or more attributes of the present state of the application that are indicative of a future workload of the application at a subsequent point in time.

8. The method of claim 7, wherein the one or more attributes include at least one of a day of the week, a time of day, a present workload of the application, a rate of increase in the present workload of the application, a rate of decrease in the present workload of the application and a promotional event schedule.

9. The method of claim 1, further comprising:
analyzing the historical performance data to detect one or more anomalies, wherein the one or more anomalies represent isolated events that are not generally indicative of routine performance of the application,
wherein analyzing both the historical performance data and the historical workload data to determine one or more scaling patterns for the application further comprises disregarding the detected one or more anomalies within the historical performance data, for purposes of determined the one or more scaling patterns.

10. The method of claim 1, wherein the present state of the application comprises at least one of a current day of the week, a current time value, a current workload of the application, a current rate of change in the current workload of the application, a current number of application instances in the plurality of application instances, and an entry in an event schedule for the application.

11. The method of claim 1, wherein determining a plan for predictively scaling the application further comprises:
upon determining that the present state of the application deviates from the historical performance data by more than a threshold amount of deviation:
determining that the present state of the application represents a performance anomaly;
determining an estimated future workload for the application, based on the historical performance data; and
determining the plan for predictively scaling the application, based on the estimated future workload and not based on a current workload of the application.

12. The method of claim 1, wherein predictively scaling the plurality of application instances, based on the determined plan, further comprises:
determining a threshold number of application instances to maintain, based on the determined plan; and
reactively scaling the plurality of application instances in response to a current workload of the application, without scaling the plurality of application instances below the threshold number of application instances.

13. The method of claim 1, further comprising monitoring, via the predictive scaling engine, the performance of the application with the scaled plurality of application instances to collect at least one of additional performance data and additional workload data, wherein the at least one of additional performance data and additional workload data is used to influence future scaling events.

14. The method of claim 1, wherein an average startup time for the application instance to be fully initialized comprises an average startup time for creating a new application instance.

15. The method of claim 1, further comprising monitoring, via the predictive scaling engine, a growth in a number of users interacting with the application over a given period of time, wherein the plan is based, at least in part, on the growth in the number of users.

16. The method of claim 1, wherein the historical performance data includes an average startup time needed for an application instance included in the plurality of application instances to be fully initialized, and wherein the future point in time is determined based on the average startup time.

17. The method of claim 16, wherein the future point in time is determined based on a buffer amount of time added to the average startup time.

18. The method of claim 1, wherein the historical performance data includes an average shutdown time needed for an application instance included in the plurality of application instances to be fully shutdown once the application instance is no longer needed, and wherein the future point in time is determined based on the average shutdown time.

19. The method of claim 1, wherein the at least a portion of the second window of time comprises a given window of time before a known peak period, and wherein the magnitude of a first peak predicted workload during the known peak period depends on the rate of change of the workload of the application.

20. A system, comprising:
at least one processor; and
a memory containing a predictive scaling engine, wherein when the at least one processor executes the predictive scaling engine, the at least one processor performs the steps of:
monitoring performance of an application within the cloud computing environment over a first window of time to collect historical performance data, wherein the application comprises a plurality of application instances;
monitoring a workload of the application over a second window of time to collect historical workload data, wherein the historical workload data indicates a rate of change of the workload of the application over the second window of time;
analyzing both the historical performance data and the historical workload data to determine one or more scaling patterns for the application, wherein a magnitude of a predicted peak workload associated with a first scaling pattern is determined based on the rate of change of the workload of the application, a number of subscriptions to the application, and a number of content items available for consumption within the application;

upon determining a present state of the application matches one of the one or more scaling patterns, determining:
- a future point in time when the application should be predictively scaled, and
- a plan for predictively scaling the application at the future point in time; and predictively scaling the plurality of application instances, based on the determined plan.

21. The system of claim 20, wherein determining the plan for predictively scaling the application further comprises:
determining that the workload of the application will increase at a first point in time, based on a present workload of the application and the matching scaling pattern;
determining an estimated future workload of the application, based on the present workload of the application; and
determining a number of additional application instances to instantiate to satisfy the estimated future workload.

22. The system of claim 21, wherein the historical performance data includes startup time data for the plurality of application instances,
wherein determining the plan for predictively scaling the application further comprises:
determining a first timeline for instantiating the number of additional application instances, based on the startup time data,
wherein predictively scaling the plurality of application instances is further based on the determined first timeline, and further comprises:
instantiating one or more additional application instances according to the determined first timeline.

23. The system of claim 22, wherein determining the plan for predictively scaling the application further comprises:
determining that the workload of the application will decrease at a first point in time, based on the present state of the application and the matching scaling pattern;
determining an estimated future workload of the application, based on the present workload of the application, wherein the estimated future workload is less than a current workload of the application; and
determining a number of the plurality of application instances that will be needed to process the estimated future workload, wherein the determined number of application instances is less than a current number of application instances.

24. The system of claim 23, wherein the historical performance data includes shutdown time data for the plurality of application instances,
wherein determining the plan for predictively scaling the application further comprises:
determining a second timeline for shutting down application instances in order to achieve the determined number of application instances, based on the shutdown time data,
wherein predictively scaling the plurality of application instances is further based on the determined second timeline, and further comprises:
shutting down one or more of the plurality of application instances according to the determined second timeline.

25. The system of claim 20, wherein determining a plan for predictively scaling the application further comprises:
upon determining that the present state of the application deviates from the historical performance data by more than a threshold amount of deviation:
determining that the present state of the application represents a performance anomaly;
determining an estimated future workload for the application, based on the historical performance data; and
determining the plan for predictively scaling the application, based on the estimated future workload and not based on a current workload of the application.

26. A non-transitory computer-readable medium including instructions that, when executed by a processor, cause the processor to perform the steps of:
monitoring performance of an application within the cloud computing environment over a first window of time to collect historical performance data, wherein the application comprises a plurality of application instances;
monitoring a workload of the application over a second window of time to collect historical workload data, wherein the historical workload data indicates a rate of change of the workload of the application over the second window of time;
analyzing both the historical performance data and the historical workload data to determine one or more scaling patterns for the application, wherein a magnitude of a predicted peak workload associated with a first scaling pattern is determined based on the rate of change of the workload of the application, a number of subscriptions to the application, and a number of content items available for consumption within the application;
upon determining a present state of the application matches one of the one or more scaling patterns, determining:
a future point in time when the application should be predictively scaled, and
a plan for predictively scaling the application at the future point in time; and
predictively scaling, via the predictive scaling engine, the plurality of application instances, based on the determined plan.

* * * * *